Jan. 19, 1960   H. C. BRADFIELD ET AL   2,921,654
SEALING MEANS FOR VEHICLE BRAKES
Filed May 16, 1956   2 Sheets-Sheet 2

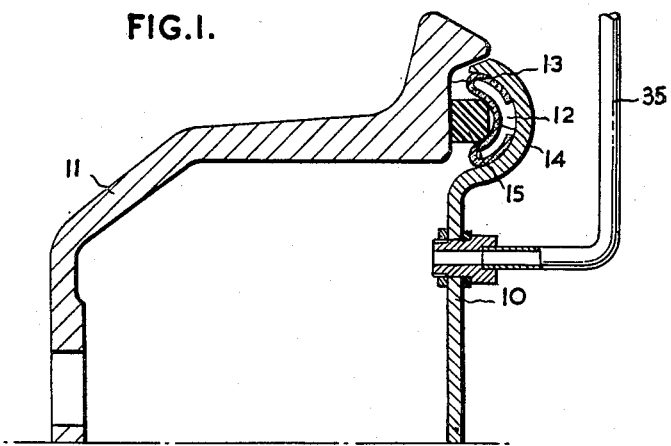
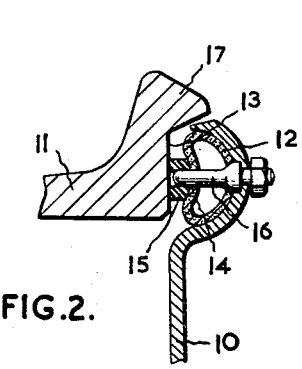
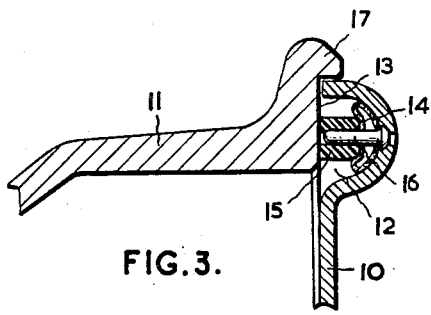
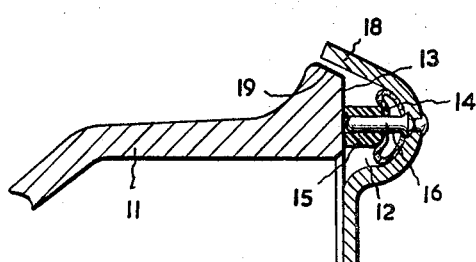

INVENTORS:
HERBERT CHARLES BRADFIELD
WILLIAM HAROLD BARNARD
LEONARD REDMAYNE
JOHN WALTER DAVIS
by Walter S. Heston
ATTORNEY United States Patent Office 2,921,654
Patented Jan. 19, 1960

2,921,654

SEALING MEANS FOR VEHICLE BRAKES

Herbert Charles Bradfield, Ickenham, William Harold Barnard, Virginia Water, Leonard Redmayne, Wolverhampton, and John Walter Davis, Rubery, Rednal, Birmingham, England, assignors to Girling Limited, Birmingham, England, a British company Application May 16, 1956, Serial No. 585,351

7 Claims. (Cl. 188—218)

This invention relates to improvements in brakes for vehicles.

The usual type of brake employed on vehicles comprises a flanged drum rotating with a wheel and a stationary back-plate carrying the shoes and the actuating means for the shoes. The back-plate fits fairly closely to the drum and normally prevents the entry of mud, but there must be a small clearance and a certain amount of mud and water tends to get into the brake. Further, if the vehicle has to pass through water of sufficient depth to submerge the drum water enters the drum in quantity and seriously affects the braking as well as causing corrosion and other damage.

For this reason various forms of sealing means have been proposed for preventing water and mud from entering a brake drum, such sealing means usually comprising a sealing ring carried by the back-plate or drum and urged by spring means into resilient sealing engagement with a co-operating surface on the drum or back-plate. In the sealing arrangements hitherto proposed the sealing ring has been positively located and guided against appreciable movement other than purely axial movement with the result that it has been possible for the sealing ring to become jammed by particles of mud or dust and to cease to be held in sealing engagement with the co-operating surface.

One object of our invention is to provide improved sealing means for an internal shoe drum brake which is substantially free from this disadvantage.

According to our invention, in an internal shoe drum brake comprising a stationary back-plate and a rotatable drum the drum is open at the end adjacent to the back-plate and has a flat radial annular face on its open end, and the back-plate has an annular channel on its periphery in alignment with that face, and a sealing ring of a radial thickness substantially less than the radial dimension of the channel is located in the channel and is urged into sealing engagement with the face on the drum by resilient means located between the ring and the base of the channel.

The sealing ring is not confined in any way by the channel but is free to float, and as there is a substantial clearance between the ring and the walls of the channel there is no appreciable risk of the ring being jammed by mud or dust or by the absorption of water so that the seal remains effective even under very adverse conditions.

The drum may be formed with an axially projecting peripheral lip or flange lying outside the flat machined radial face with which the sealing ring engages and extending over the peripheral edge of the channel on the back-plate to protect the seal against mud or grit. The co-operating surfaces on the drum and the back-plate may be frusto-conical or cylindrical.

Alternatively, the outer lip of the channel on the back-plate may be extended in an axial direction or in an outwardly inclined direction to co-operate with a complementary surface on the periphery of the drum for the same purpose.

Some practical forms of sealing means in accordance with our invention are illustrated by way of example in the accompanying drawings in which:

Figure 1 is a fragmentary section of a seal arranged between the periphery of the stationary back-plate of a brake and the end of the flange of the brake drum.

Figure 2 is a similar view showing the sealing ring worn down and also showing means for holding the ring against angular movement relative to the back-plate.

Figures 3, 4 and 5 are sections similar to Figure 1 showing various modifications.

Figure 5:
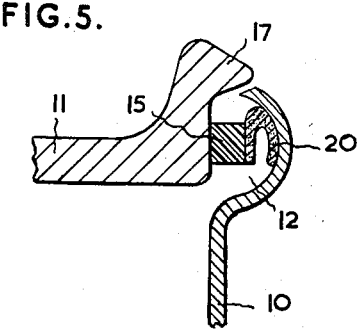

In Figure 1, 10 is the stationary back-plate of a brake and 11 is the brake drum which has the usual peripheral axially extending flange and is open at the end adjacent to the back-plate. The periphery of the back-plate is formed with an annular channel or recess 12 of substantially semi-cylindrical cross-section facing a flat annular radial surface 13 machined on the free edge of the flange of the brake drum.

A continuous resilient rubber or other member 14 of tubular or C cross-section is housed in the channel or recess 12 and carries on its side next to the brake drum a ring 15 of plastic, fibre, or other suitable material having a flat face which is urged by the rubber member 14 into rubbing contact with the face 13 on the drum to seal the space between the back-plate and the drum.

The member 14 in its free condition is of substantially circular cross-section but the axial length or thickness of the sealing ring initially is such that the member is compressed as shown in Figure 1 to a crescent section against the base of the channel when the brake drum is fitted so that the member exerts a resilient force on the sealing ring urging it into sealing contact with the annular radial surface 13 on the drum.

As the sealing ring wears the member 14 expands from a crescent section towards a semi-circular section as shown in Figure 2 while maintaining its pressure on the sealing ring.

The sealing ring may be bonded to the surface of the member 14, and angular movement of the ring relative to the back-plate may be prevented by pegs 16 which are riveted or otherwise secured into the base of the channel and which extend through the member 14 into holes or recesses in the ring.

Various forms of resilient member other than that shown may be employed for urging the sealing ring into engagement with the drum so long as the resilient member closes the gap between the sealing ring and the back-plate.

In Figures 1 to 3 the drum is formed with an axially projecting peripheral lip or flange 17 lying outside the machined surface 13 with which the sealing ring engages and extending over the peripheral edge of the channel on the back-plate to protect the seal against mud or grit. In Figures 1 and 2 the co-operating surfaces on the lip or flange 17 and on the back-plate are frusto-conical while in Figure 3 they are cylindrical.

In an alternative arrangement shown in Figure 4 the outer lip of the channel on the back-plate is extended in an axial direction or in an outwardly inclined direction as shown at 18 to co-operate with a complementary surface 19 on the periphery of the drum for the same purpose.

In the modification shown in Figure 5 the sealing ring 15 is urged into engagement with the machined surface 13 on the drum by a rubber or like resilient member 20 of U section mounted with one limb against the base of the channel in the back-plate and the other against the ring. Preferably the material between the limbs of the U is considerably thicker than the limbs themselves to give the necessary resilience. The limbs are pressed close together in the channel when the sealing ring is new and as the ring wears the limbs gradually separate to maintain pressure on the ring and hold it in sealing engagement with the drum. The parts may be secured together by bonding one limb of the U-shaped pressure member 20 to the sealing ring and the other to the inner wall of the channel in the back-plate.

In some cases, particularly for use in tropical regions, it may be found advantageous to form the pressure applying member 14 or 20 of rolled or folded resilient metal strip such as Phosphor bronze or steel.

Various means other than the pegs 16 shown in Figures 2 and 3 can be used for holding the sealing ring against angular movement. For example, radial tongues or grooves on the inner periphery of the sealing ring may be engaged by complementary parts on the back-plate.

Figure 6:
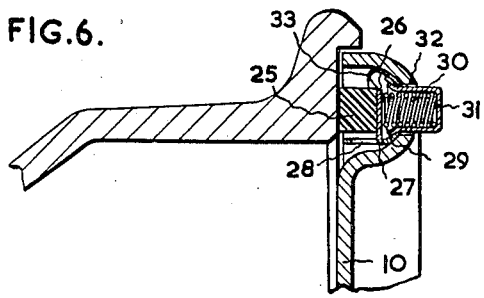
Figure 6 is a section of a further form of seal.
Figure 7:
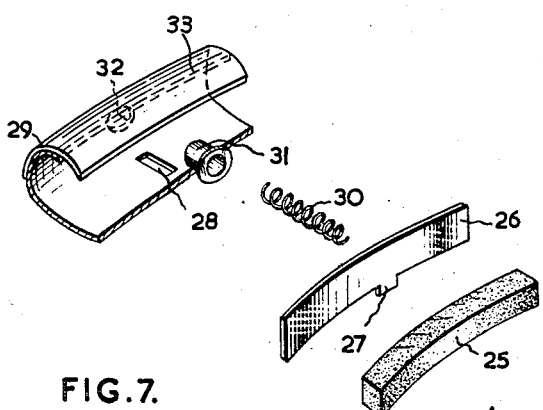
Figure 7 is a perspective view of separated members of the seal shown in Figure 6.

In the construction shown in Figures 6 and 7 a sealing ring 25 is backed by a flat metal locating ring 26 which has at intervals on its inner edge tongues 27 slidable in axially extending slots 28 in an axially extending flange on the inner edge of a supporting ring 29 of curved cross-section fitting into an annular channel or recess in the back-plate. The necessary axial pressure to hold the sealing ring in engagement with the drum is provided by angularly spaced compression springs 30 bearing against the locating ring 26 and housed in flanged spring boxes or thimbles 31 which are mounted in and extend through aligned openings 32 in the supporting ring and in the base of the channel. The gap between the sealing ring and the back-plate is sealed by a rubberized canvas or other flexible gaiter 33 which may be bonded to the supporting ring and between the locating ring and the sealing ring.

It is desirable that the interior of the brake drum should be maintained at a pressure equal to that of the external atmosphere in order to prevent water from being drawn in with changes of temperature if the drum is submerged. For this purpose a breather pipe 35 may be fitted to the upper part of the stationary back-plate as shown in Figure 1, the pipe extending upwardly to a point well above the level of the assembly to avoid the entry of water or mud into the mechanism. It will be clear that such breather pipe may be applied to any one of the various illustrated forms of the invention.

We claim:

1. An internal shoe drum brake for vehicles comprising a stationary back-plate, a rotatable drum open at the end adjacent to the back-plate, a flat radial annular face on the open end of and formed by a part rigid with said drum, an annular channel in the peripheral portion of the back-plate in alignment with said face, a sealing ring located within said channel and having a flat surface on the side adjacent said face on the drum, the radial width of said channel being substantially greater than the radial width of said sealing ring, and means located between said ring and the base of the channel and including an annular part in continuous engagement throughout its circumference with the sealing ring face opposite the flat surface thereof, and means for resiliently urging said last-named means against said opposite surface of said sealing ring to urge the ring into sealing engagement with said flat face on the drum, and means to seal the gap between said channel and the outer peripheral edge of said opposite face of said sealing ring and said channel.

2. An internal shoe drum brake as in claim 1, said resilient means being annularly expansible in an axial direction and being located between the sealing ring and the base of the channel.

3. An internal shoe drum brake as in claim 1, in which said annular means bears against the sealing ring, the resilient means bears against said channel, the two such means being interconnected by a U-shaped sealing means.

4. An internal shoe drum brake as in claim 1 wherein means are provided for locating the sealing ring against angular movement relative to the channel.

5. An internal shoe drum brake as in claim 1 wherein a breather pipe is connected to the stationary back-plate of the brake to maintain the pressure within the drum substantially equal to that of the external atmosphere, the open end of the pipe being located in an elevated position relative to the brake assembly.

6. An internal shoe drum brake for vehicles comprising a stationary back-plate, a rotatable drum open at the end adjacent to the back-plate, a flat radial annular face on the open end of said drum, an annular channel in the peripheral portion of the back-plate in alignment with said face, a sealing ring of a radial thickness substantially less than the radial dimension of said channel located within the channel, a supporting ring of curved cross-section fitting within said channel, axially extending angularly spaced slots in the radially innermost wall of said supporting ring, a flat metal backing ring for said sealing ring, spaced tongues on the inner edge of said backing ring engaging in said slots, angularly spaced thimbles mounted in the base of the said channel in the backing plate, and springs mounted in said thimbles and bearing against the backing ring to urge the sealing ring into engagement with the flat face on the brake drum.

7. An internal shoe drum brake as in claim 6, further comprising a flexible gaiter-like ring bonded to said supporting ring and between said backing ring and said sealing ring so as to seal the gap between said sealing ring and said back plate.

References Cited in the file of this patent

UNITED STATES PATENTS

| | | |
|---|---|---|
| 1,930,708 | Cunningham | Oct. 17, 1933 |
| 2,197,583 | Koeppen et al. | Apr. 16, 1940 |
| 2,639,195 | Bock | May 19, 1953 |
| 2,734,600 | Strickland | Feb. 14, 1956 |
| 2,790,523 | Fawick | Apr. 30, 1957 |